(12) United States Patent
Ohira

(10) Patent No.: US 7,887,194 B2
(45) Date of Patent: Feb. 15, 2011

(54) SIMPLIFIED PLANETARIUM APPARATUS AND SIMPLIFIED IMAGE PROJECTING APPARATUS

(76) Inventor: Takayuki Ohira, 18-25, Minamiikuta 2-chome, Tama-ku, Kawasaki-shi, Kanagawa (JP) 2140036

( * ) Notice: Subject to any disclaimer, the term of this patent is extended or adjusted under 35 U.S.C. 154(b) by 642 days.

(21) Appl. No.: 11/919,424

(22) PCT Filed: Apr. 27, 2006

(86) PCT No.: PCT/JP2006/308805

§ 371 (c)(1),
(2), (4) Date: Oct. 26, 2007

(87) PCT Pub. No.: WO2006/118172

PCT Pub. Date: Nov. 9, 2006

(65) Prior Publication Data

US 2009/0273762 A1  Nov. 5, 2009

(51) Int. Cl.
*G03B 21/00* (2006.01)
(52) U.S. Cl. ....................................................... 353/62
(58) Field of Classification Search ................ 353/35, 353/62
See application file for complete search history.

(56) References Cited

U.S. PATENT DOCUMENTS 2,959,094 A * 11/1960 Kosma .................... 352/87
3,088,228 A     5/1963 Eisenhauer
4,497,582 A *  2/1985 Lipman et al. ............... 368/15
4,779,176 A * 10/1988 Bornhorst ................... 353/62
5,010,362 A     4/1991 Otsuki et al.

FOREIGN PATENT DOCUMENTS

| DE | 40 00 906 A1 | 7/1991 |
| GB | 2 355 080 A | 4/2001 |
| JP | 55-144341 | 11/1980 |
| JP | 61-43781 | 3/1986 |
| JP | 01-145681 A | 6/1989 |
| JP | 3032993 A | 2/1991 |
| JP | 04-204586 | 7/1992 |
| JP | 2003-241303 | 8/2003 |
| JP | 2003 241303 A | 8/2003 |
| JP | 3566460 A | 6/2004 |

* cited by examiner

*Primary Examiner*—Thanh X Luu
(74) *Attorney, Agent, or Firm*—Venable LLP; Michael A. Sartori; Justine A. Gozzi

(57) ABSTRACT

Light emitted from a light source passes through a stellar base plate, a fixed aperture, and a wide-angled projection lens via a condenser lens and projects a starry sky on a screen. The stellar base plate is a light-shielding disk having a number of through holes which correspond to positions and brightness of actual stars, is supported by an inner ring of a ball bearing having the center at a position corresponding to the axis of rotation so as to be capable of rotating about the axis of rotation, and is driven by a motor via a belt. The centers of the projection lens, a window of the fixed aperture, the condenser lens, and the light source are all arranged on the optical axis, and the centers of the stellar base plate, the pulley and the ball bearing correspond to the axis of rotation.

12 Claims, 11 Drawing Sheets

FIG. 6
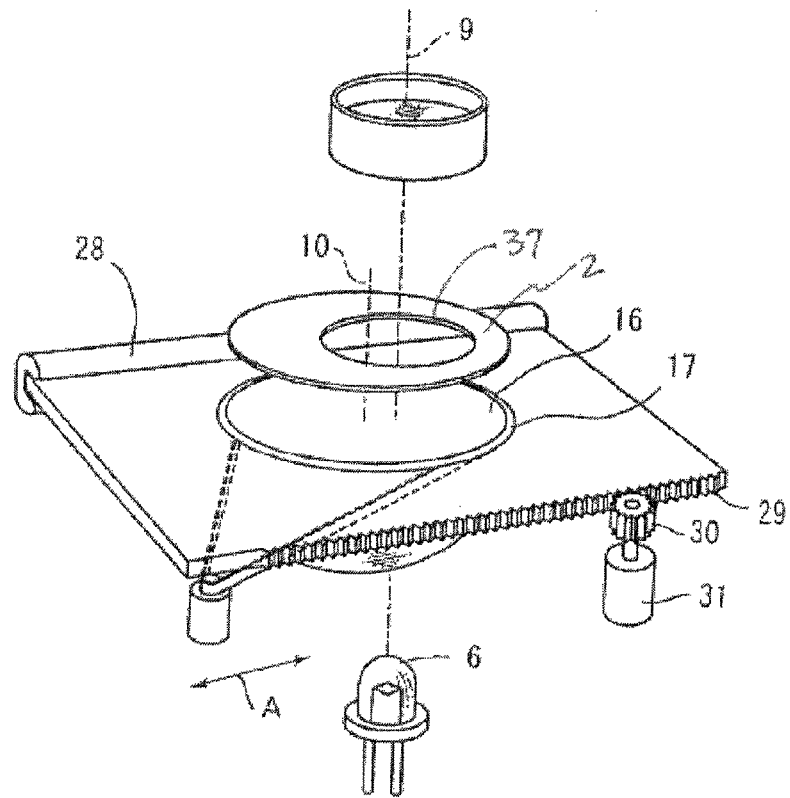
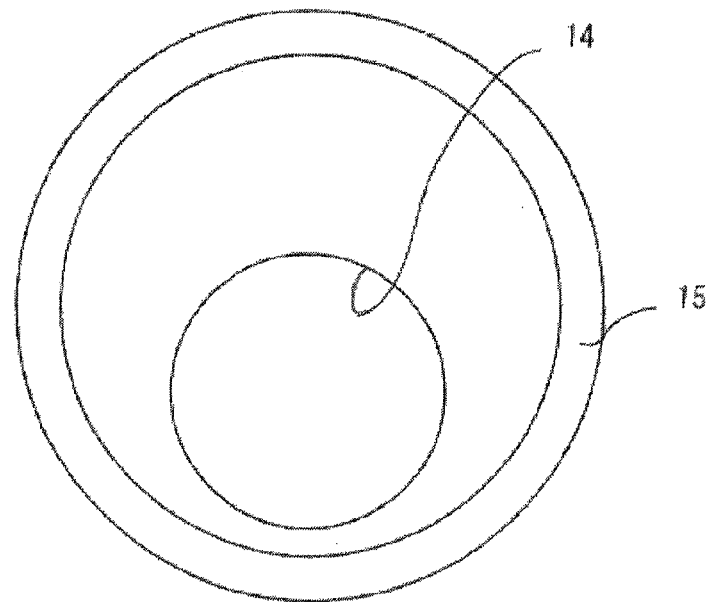
FIG. 7

SIMPLIFIED PLANETARIUM APPARATUS AND SIMPLIFIED IMAGE PROJECTING APPARATUS

BACKGROUND OF THE INVENTION

1. Field of the Invention

The present invention relates to a simplified planetarium apparatus which is able to project a starry sky simply in a home environment, and an image projecting apparatus which is capable of projecting images.

2. Description of the Related Art

A planetarium apparatus which reproduces the starry sky and moves the starry sky as desired artificially even in the daytime achieves not only reproduction of the beautiful starry sky day and night for appreciation, but also reproduction of a celestial motion such as stars (fixed stars). Therefore, it is used all over the world as a preferable apparatus for leaning astronomy.

FIG. 9 illustrates a basic configuration of a known optical planetarium apparatus. A stellar projection sphere 48 is supported so as to be capable of rotating about a diurnal axis 44, and the angle is set to an angle 46 which is the same as the latitude of an observation point. Reference numeral 43 designates a light source, which is set to the center of the stellar projection sphere 48. A plurality of projection units 52 are arranged on the surface of the stellar projection sphere 48 at predetermined angles. Light emitted from the light source 43 passes through condenser lenses 51, stellar base plates 50 having through holes corresponding to stars on a light-shielding material, and projection lenses 49 of the projection units 52 and focuses on a dome screen 47 to reproduce an image of the starry sky. Since the range of reproduction by the single projection unit 52 is limited, the plurality of projection units 52, for example, twelve to thirty-two projection units 52 are arranged to cover the entire sky, so that an artificial starry sky which is similar to the real starry sky is reproduced.

Assuming that the center of the stellar projection sphere is a view point, the apparatus shown in FIG. 9 is able to project the stars at quite accurate positions on the dome screen. In addition, through the usage of the lenses, a sharp and realistic starry sky is reproduced. Examples of the optical planetarium apparatus being similar in basic configuration are described in Japanese Patent No. 2632438 and Japanese Unexamined Patent Application Publication No. 43781/1986.

FIG. 10 illustrates a basic configuration of a known pin-hole type planetarium apparatus. Although the basic configuration is similar to the optical planetarium apparatus, through holes 42 which correspond to the stars are directly formed on a light-shielding stellar projection sphere, and the light source 43 is installed therein. The light emitted from the light source 43 passes through these through holes 42, and is projected onto the dome screen 47, which has a look of the starry sky. The stars are projected at the accurate positions in the same manner as the optical planetarium apparatus. In Japanese Unexamined Utility Model Registration Application Publication No. 144341/1980, an example which is similar to the pin-hole type planetarium apparatus in basic configuration is disclosed.

The optical planetarium apparatus in the related art as shown above has a configuration in which the plurality of projection lenses and the stellar base plates are used, and these members are assembled to the stellar projection sphere. Therefore, there are problems such that the structure is complex, a large number of components are necessary, the part production cost and the assembly and adjustment cost are high, and the weight of the apparatus body is liable to be heavy, so that the handling is difficult. Therefore, the usage is limited to places such as public facilities having sufficient financial resources. In contrast, since the pin-hole type planetarium apparatus does not use lenses, the configuration is significantly simple in comparison with the optical planetarium apparatus. However, since it has a configuration to project shadows, it is difficult to obtain sharp images. In order to obtain the sharp images, it is necessary to use a light source having an extremely small light-emitting point, so that the choice of the light source is limited.

Furthermore, since the stellar projection sphere is composed of a polyhedron formed by assembling spherical materials or flat materials, punching holes on the spherical surface is costly, and when assembling flat projection base plates, there arise problems of operating cost and generation of joints. In addition, since the projection base plates are exposed directly to the outside air, the star image is subjected to the influence of dust.

The planetarium apparatus is a superior apparatus in which the sky with full of stars as great outdoors is reproduced, and enjoying such starry sky not only in the facilities but also in the home environment, or studying the movement of constellation is in demand in the world. However, in order to satisfy such demand, it is desired to be able to project the stars directly in the room in a rectangular parallelepiped shape without the dome screen since installation of the dome screen is difficult and complicated. When the above-described optical planetarium apparatus and the pin-hole type planetarium apparatus are used in the home environment, the stars and constellation can barely be projected on a flat plane in a recognizable image quality. However, when the image is overlapped with the corners of the room or with the furniture, the positions where the stars appear are significantly distorted, and hence the constellations cannot be recognized easily. Depending on the colors of the furniture, the image itself cannot give good definition. When the optical planetarium apparatus is carried in, the projection lenses by themselves move and the distance with respect to the wall surface which serves the projection screen varies in complex manner, so that the image may go out of focus, and hence the distance of the space between the lenses varies, whereby the shape of the constellation may be distorted.

From these reasons, it is difficult to serve the needs of enjoying the beautiful starry sky and learning the constellations at home with a low cost apparatus.

SUMMARY OF THE INVENTION

Accordingly, it is an object of the invention to provide a simplified planetarium apparatus which costs much less than an optical planetarium apparatus in the related art, and is easy to handle, which projects a sharp and beautiful starry sky in comparison with a pin-hole type, and which is capable of reproducing the starry sky freely in a home environment without using a specific dome screen.

It is another object of the invention to provide a planetarium apparatus which is capable of changing the number of stars or the presence or absence of the constellation picture freely and an image projecting apparatus which is capable of projecting various images.

In order to achieve the above-described object, an aspect of the invention is characterized in that a light source, a light converging optical system that converges light from the light source, a rotatable stellar base plate having holes corresponding to stars such as stars or constellations or a transmissive pattern corresponding to the holes, a rotating mechanism that rotates the stellar base plate about an axis of rotation corresponding to the optical axis of the optical system or being deviated therefrom, and a projecting optical system including a lens or a reflecting mirror are provided, and the portion of the stellar base plate to be projected is shiftable by the rotating mechanism, and transmitted light passed through the stellar base plate is projected onto a horizontal surface, an inclined surface, a vertical surface, a curved surface or a spherical surface of a ceiling or a wall by the projecting optical system to reproduce a starry sky.

Preferably, the range to be projected is limited by providing a diaphragm having a fixed aperture in front of or behind the stellar base plate. Preferably, a sliding mechanism that changes the distance between the center axis of rotation of the stellar base plate and the optical axis of the projection lens is provided. Preferably, the stellar base plate is replaceable. Preferably, the light source is a light-emitting diode. Preferably, a complex effect of production is achieved by providing a plurality of the apparatus described above and electrically connecting the apparatus with each other or connecting with mechanical means for operating in conjunction with each other, and controlling projection of the respective apparatus between on and off.

A second aspect of the invention is characterized in that a light source, a light converting optical system that converges light from the light source, a transmissive base plate having a given image, a rotating mechanism that rotates the transmissive base plate about an axis of rotation corresponding to the optical axis of the optical system or being deviated therefrom, and a projecting optical system including a lens or a reflecting mirror are provided, and the portion of the transmissive base plate to be projected is shiftable by the rotating mechanism, and transmitted light passed through the transmissive base plate is projected onto a horizontal surface, an inclined surface, a vertical surface, a curved surface, or a spherical surface of a ceiling or a wall by the projecting optical system to reproduce the image.

Preferably, the range to be projected is limited by providing a diaphragm having a fixed aperture in front of or behind the transmissive base plate. Preferably, a sliding mechanism that changes the distance between the center axis of rotation of the transmissive base plate and the optical axis of the projection lens is provided. Preferably, the transmissive base plate is replaceable. Preferably, the light source is a light-emitting diode. Preferably, a complex effect of production is achieved by providing a plurality of the apparatus described above and electrically connecting the apparatus with each other or connecting with mechanical means for operating in conjunction with each other, and controlling projection of the respective apparatus between on and off.

With the configuration as described above, a simplified planetarium apparatus which is capable of being manufactured at low cost, being used at a home environment without using an additional facility such as a dome and projecting a clear and beautiful starry sky, and a simplified image projecting apparatus which is capable of projecting clear images.

BRIEF DESCRIPTION OF THE DRAWINGS

FIG. 6 illustrates another embodiment of the invention in which the center axes of rotation of a transmissive base plate and a ball bearing are variable with respect to the optical axis;

FIG. 7 illustrates a planisphere;

DESCRIPTION OF THE PREFERRED EMBODIMENTS

Figure 1A:
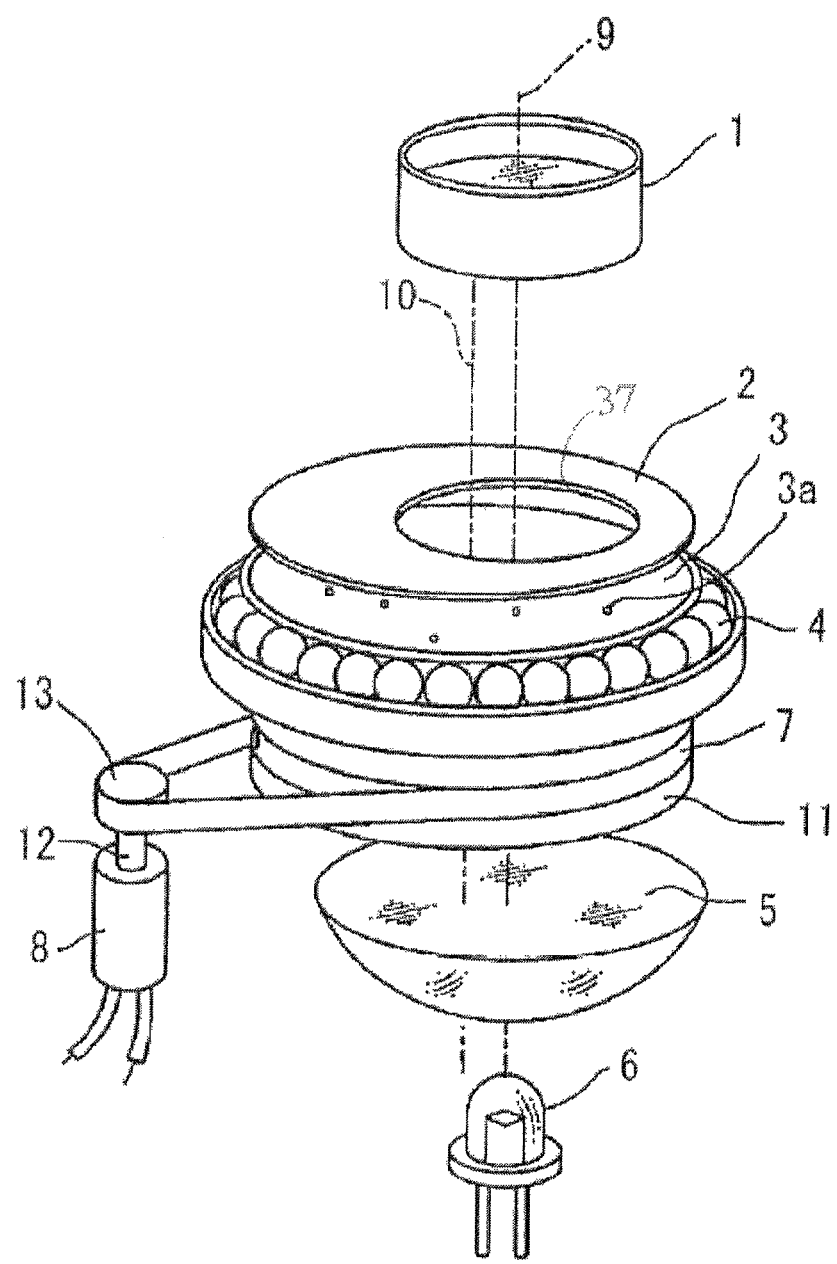
FIG. 1A is a schematic perspective view showing an embodiment of a simplified planetarium apparatus according to the invention.

Referring now to the drawings, embodiments of the invention will be described in detail.

FIG. 1A is a schematic drawing showing an embodiment of a planetarium apparatus according to the invention. For example, light emitted from a light source 6 composed of, for example, a light-emitting diode passes through a condenser lens 5, then, passes through a stellar base plate 3, a diaphragm 2 having a fixed aperture or window 37, and a wide angled projection lens 1, and is projected on a screen, so that a starry sky is displayed thereon.

The stellar base plate 3 is a light-shielding metallic or plastic disk having a number of through holes 3a which correspond to the positions and brightness of actual stars, and is manufactured by etching on a metal thin film, or by application of a photographic film at low cost. When the photographic film is used, a transmissive pattern which corresponds to the through holes is exposed on the film. The stellar base plate 3 is supported by an inner ring of a ball bearing 4 having the center at a position corresponding to an axis of rotation 10 so as to be capable of rotating about the axis of rotation 10. The stellar base plate 3 is driven by a motor 8 via a belt 7. The belt 7 is extended between a pulley 13 mounted to an output shaft 12 of the motor 8 and a pulley 11 fixed to the stellar base plate 3, and the rotation of the motor 8 is reduced and is transmitted to the stellar base plate 3. Parts other than the stellar base plate 3 are fixed. The centers of the projection lens 1, a window 37 of the diaphragm 2, the condenser lens 5 and the light source 6 are all aligned with an optical axis 9, and the centers of the stellar base plate 3, the pulley 11 and the ball bearing 4 are aligned with the axis of rotation 10.

Figure 2:
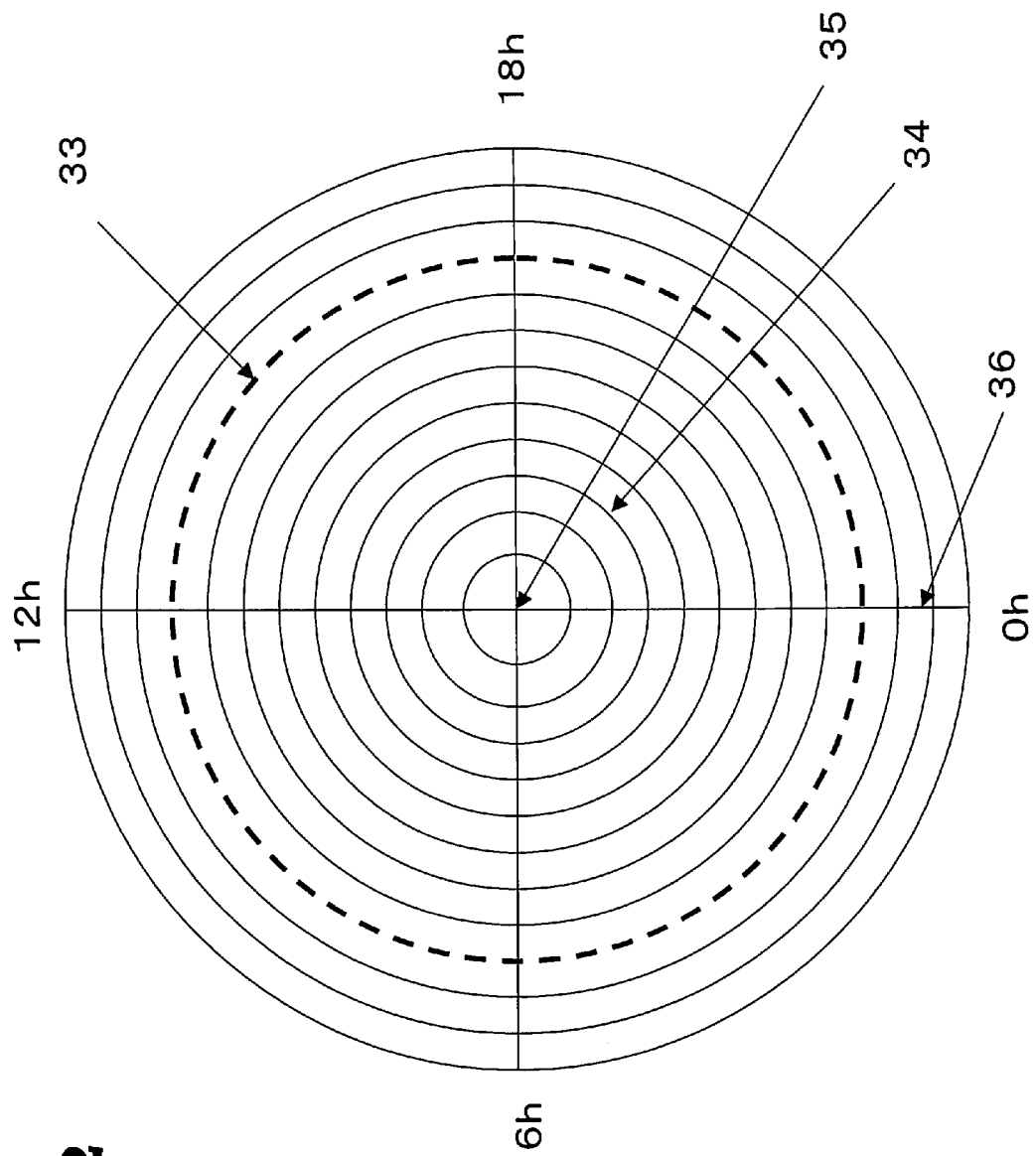
FIG. 2 is an explanatory drawing for explaining coordinate setting of a stellar base plate in FIG. 1.

The range of the stellar base plate 3 to be projected by the projection lens 1 is dependent on the positional relationship between the rotational position of the stellar base plate 3 and the diaphragm 2. FIG. 2 illustrates coordinate setting of the stellar base plate. The positions of the stars are defined on the basis of equatorial coordinates, and the stellar base plate 3 has a celestial north pole 35 at the center, and has right ascension in the direction of rotation and declination in the radial direction. Declination lines 34 in FIG. 2 are marked by scale markings in increments of 10° declination, and represent 80°, 70° . . . and so forth in sequence from the celestial North Pole 35, that is, 90° declination toward the outer periphery. A broken line 33 represents 0° declination, that is, a celestial equator. The outside the periphery thereof also includes part of the southern sky in a form of −10°, −20° declination . . . and so forth.

Figure 3:
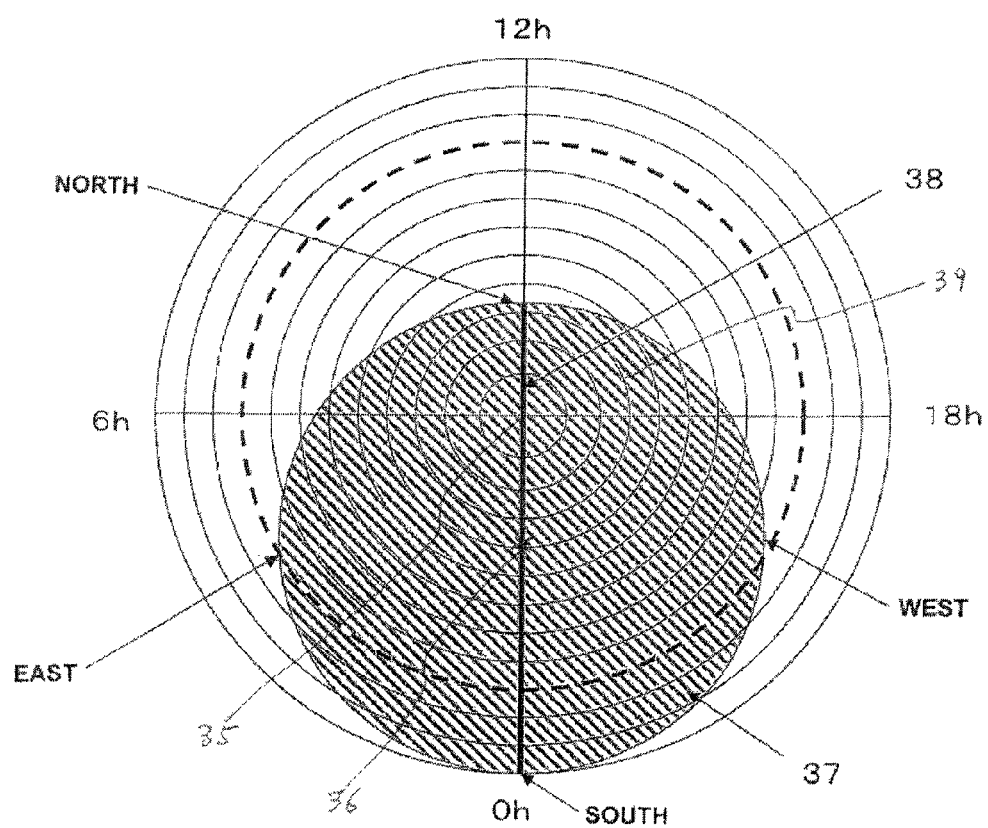
FIG. 3 illustrates a range which is actually projected by using the stellar base plate and a diaphragm having a fixed aperture in FIG. 1.
Figure 4:
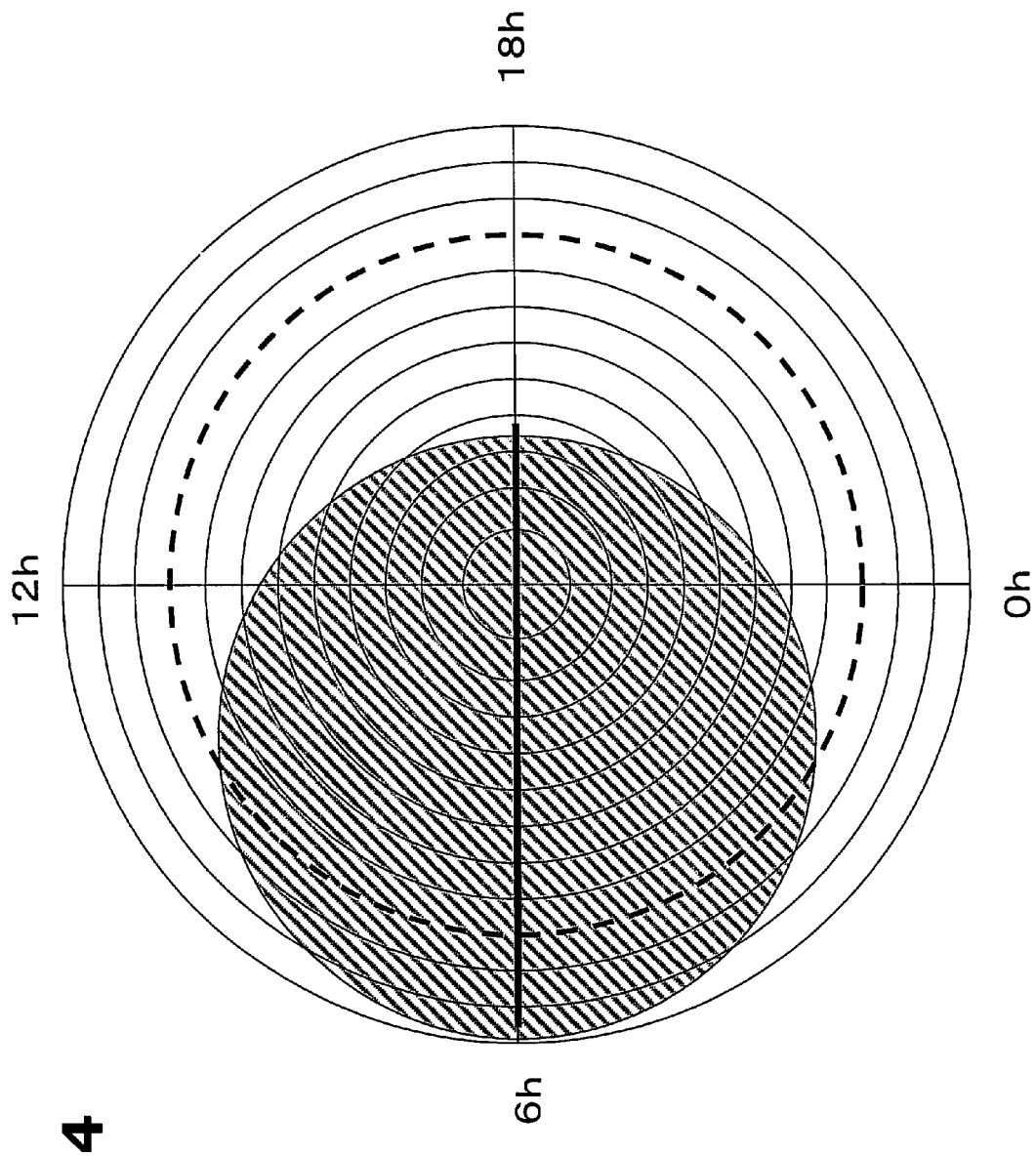
FIG. 4 illustrates a state in which the stellar base plate in FIG. 3 is rotated by 90°.

FIG. 3 illustrates a range actually projected in a state in which the stellar base plate 3 and the diaphragm 2 are overlapped with each other as they are viewed in the direction of the optical axis. The portion indicated with oblique lines is located correspondingly to the window 37, and the portion is a range which is actually projected through the window 37 and is a part of the stellar base plate. The center of the window 37 corresponds to the zenith 36 and portions within the circle 39 of stellar base plate are always within the window 37 for the rotation of the stellar base plate. The contour corresponds to the horizon, and directions of the north, the south, the east and the west are respectively specified. A line 38 connecting the south and the zenith is the meridian. Since the meridian is overlapped with the 0 h in the right ascension in FIG. 3, it shows a state of 0 h in sidereal hour. It corresponds to a state which is about equal to the night sky in autumn is reproduced. FIG. 4 illustrates a state in which the stellar base plate 3 is rotated by 90°. Since the 6 h in right ascension is overlapped with the meridian, it shows a state of 6 h in sidereal hour. It corresponds to a state which is about equal to the night sky in winter. Through the rotation of the stellar base plate 3, the sidereal hour can be set to a desired value, and hence the basic diurnal motion of stars such as variation in seasons of spring, summer, autumn and winter, and time transition is reproduced. Therefore, it has the same configuration as a known planisphere 15 in FIG. 7, and is an easily comprehensive example showing that the dummy diurnal motion of the stars is reproduced with this embodiment.

FIG. 6 shows another embodiment of the invention, in which the embodiment shown in FIG. 1 is further improved, and a slide rail mechanism for making the axis of rotation 10 of a transmissive base plate and a ball bearing variable with respect to the optical axis 9. A ball bearing 17 and a transmissive base plate 16 are supported by a slide plate 28 provided with a rack gear 29 on the side surface thereof. An output shaft of a motor 31 is provided with a pinion gear 30, and the pinion gear 30 meshes with the rack gear 29. The slide plate 28 is slidable in the direction indicated by an arrow A by driving the motor 31 in the normal and reverse direction.

Figure 5:
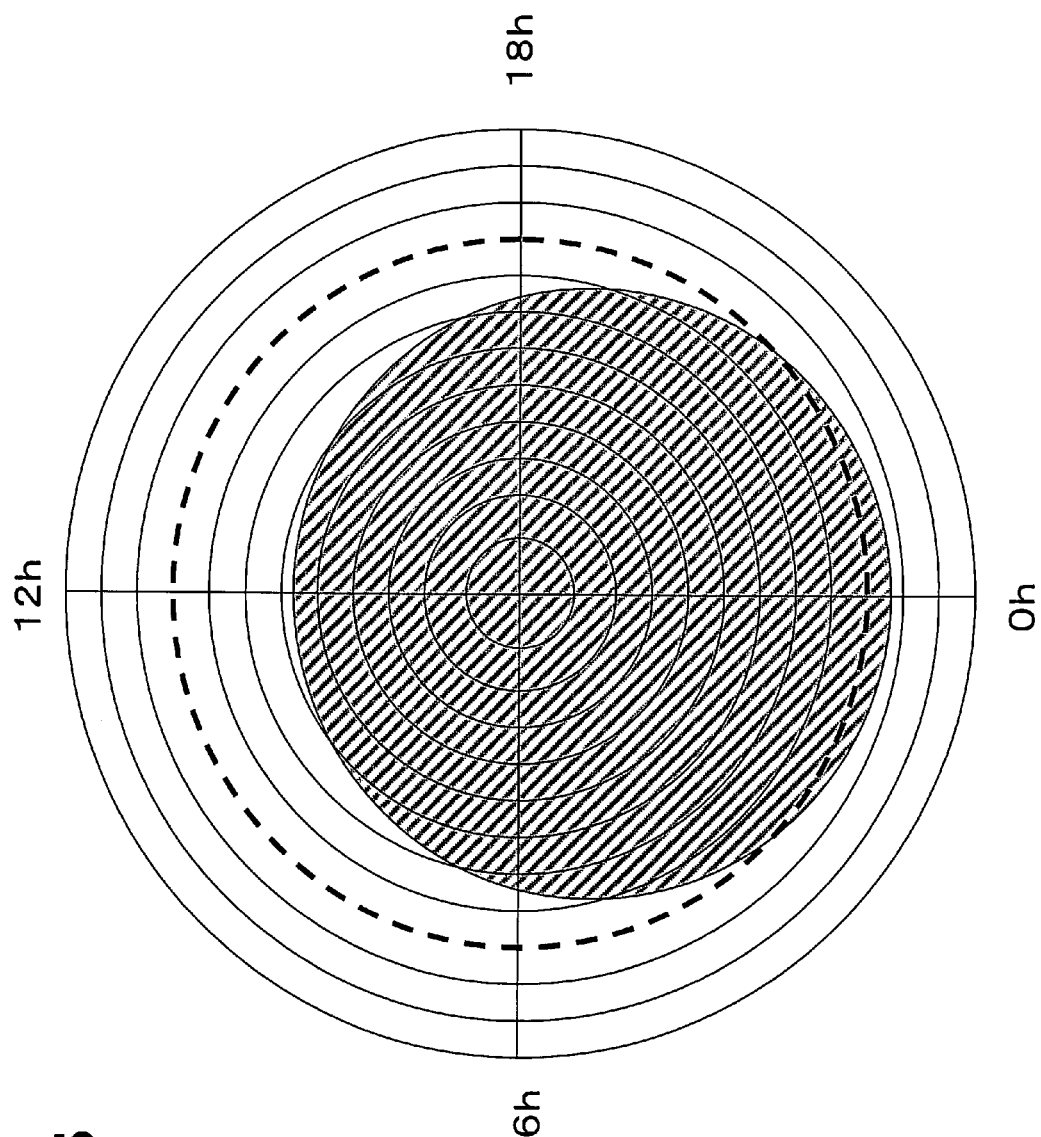
FIG. 5 illustrates a state in which the position of the stellar base plate with respect to the fixed aperture is shifted by a slide rail mechanism.

FIG. 5 illustrates a state in which the position of the transmissive base plate is moved with respect to the fixed aperture or window 37 by the sliding mechanism in FIG. 6. When the range to be projected is moved toward the center, the stars in the south sky are projected to a lower position (apart from the center) and the stars in the north sky are projected to a higher position (closer to the center). This means that a viewer moved to a position higher in latitude.

In this manner, the stars viewed from locations in various latitudes are reproduced only by changing the distance between the optical axis 9 and the axis of rotation 10. The state in which the optical axis 9 and the axis of rotation 10 are aligned corresponds to the starry sky viewed from North Pole. That is, the diurnal motion in which the stars do neither rise nor set in is reproduced. In this example, the movement of the starry sky in the northern hemisphere has been described. Alternatively, however, it is needless to say that the starry sky of the southern hemisphere is also reproducible by using a transmissive base plate in which the center is set to a celestial south pole, the declinations are set to be increased toward the outer periphery, and the direction of the right ascension is opposite, and setting the direction of rotation opposite.

Figure 8:
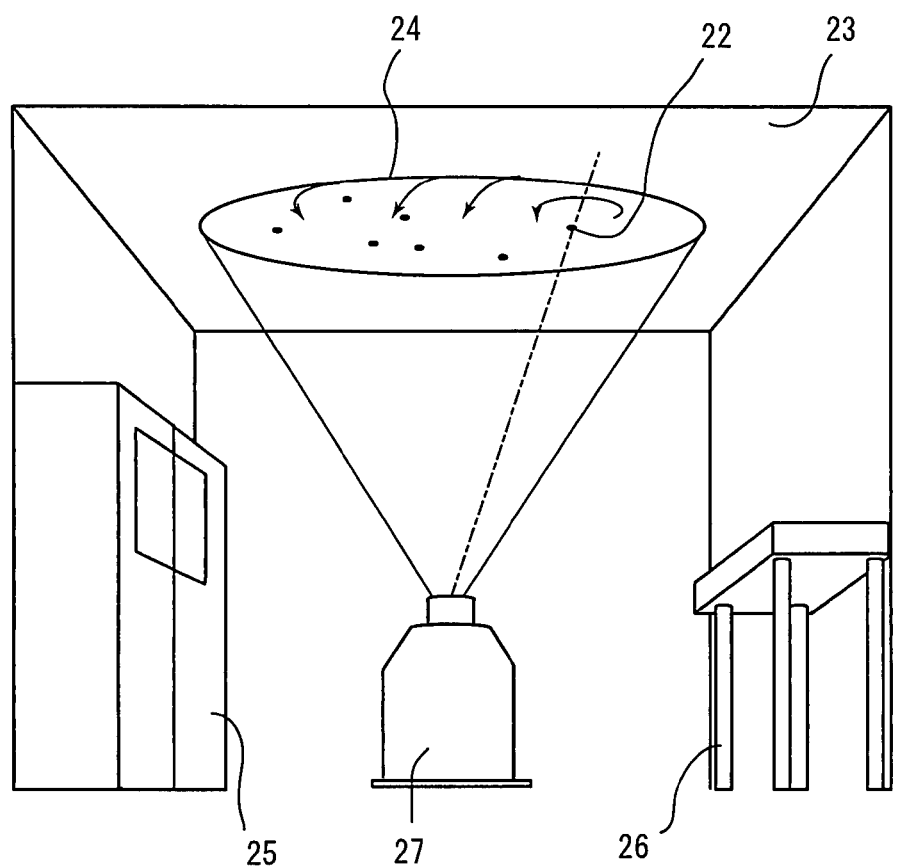
FIG. 8 illustrates a state in which the simplified planetarium apparatus according to the invention is used to project stars in a general room.
Figure 9:
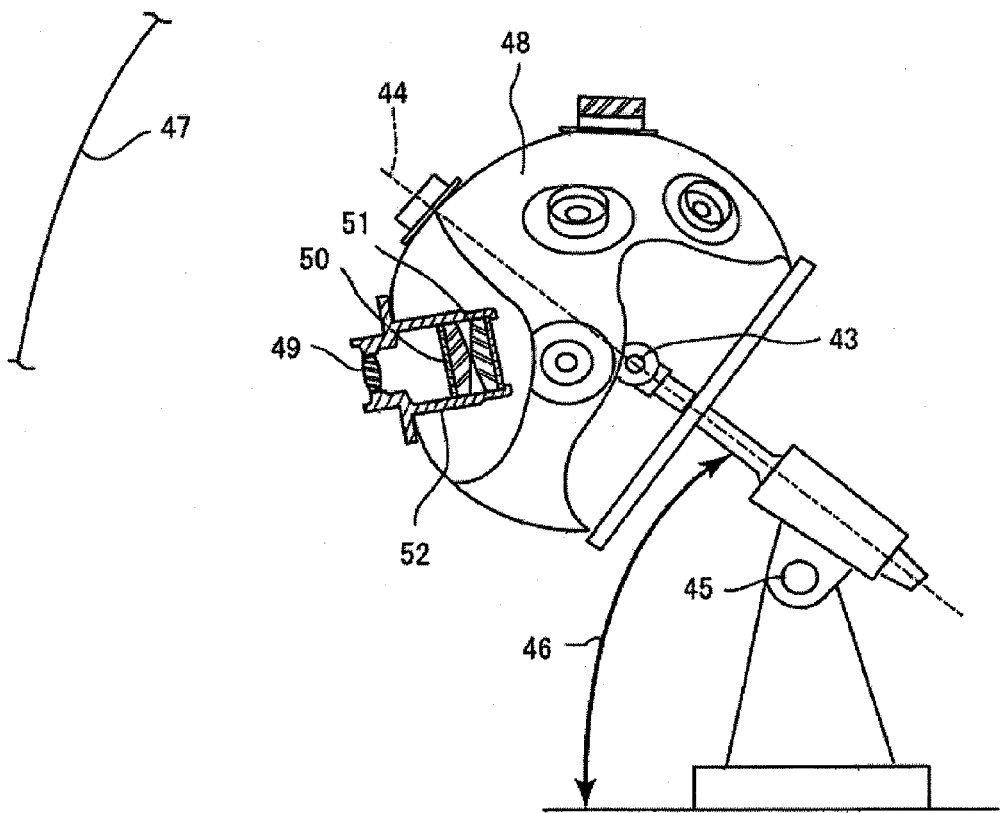
FIG. 9 illustrates a basic configuration of a known optical system planetarium apparatus.
Figure 10:
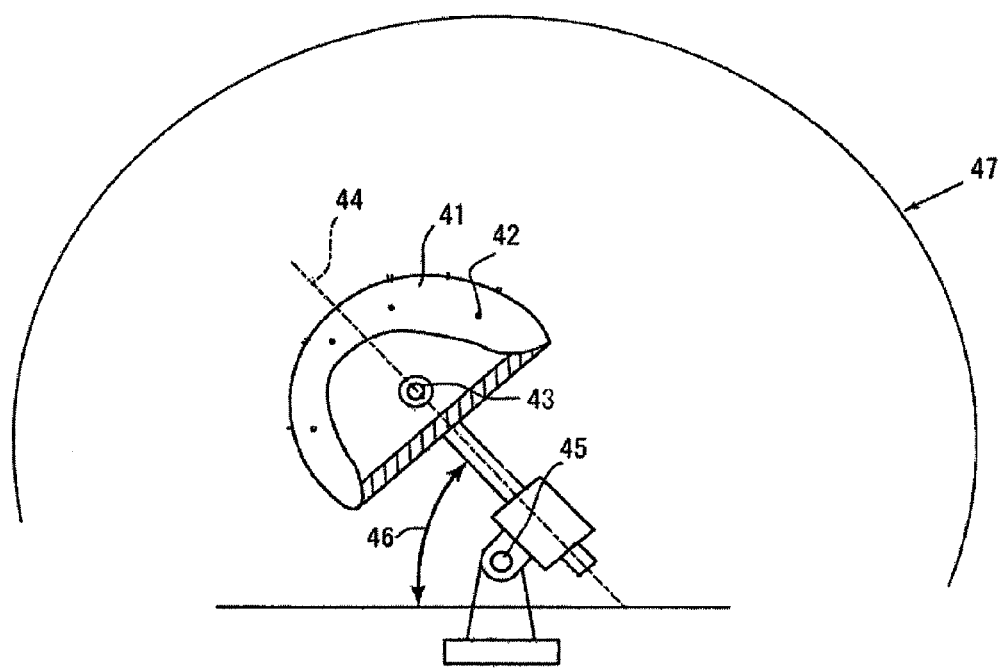
FIG. 10 illustrates a basic configuration of a known pinhole type planetarium apparatus.

FIG. 8 illustrates a state in which stars are projected in a general room using the simplified planetarium apparatus according to the invention. Since stars which almost correspond to the entire sky may be projected only on a ceiling 23 without being hindered by corners of the room, or furniture such as book shelf 25 or a desk 26, the constellations 24 in the entire sky can be observed easily. Since the stars are projected through the lens, a sharp and realistic starry sky is reproduced. In addition, since the transmissive base plate can be manufactured at low cost, the starry sky with full of beautiful stars may be reproduced by providing a transmissive base plate mounting and demounting mechanism and using base plates having, for example, a large number of stars and replacing these transmissive base plates. This configuration is suitable for relaxation or astronomic observation for technically advanced peoples. On the contrary, when the base plates with less number of stars are used, the starry sky in which constellations can easily be found is reproduced.

The constellations are found easily and learned by using a base plate with drawings of constellations, astronomical lines which connect stars and names of the constellations marked thereon. Furthermore, celestial bodies such as planets are also reproducible by using a base plate with the positions of the planets in each month marked thereon. Alternatively, it may also be used as a general-purpose slide projector or an illuminating apparatus by using a transmissive base plate in which transmissive patterns other than astronomical objects such as the stars or the planets, for example, a scene, landscape, people, or characters are marked, so that the apparatus with high versatility is achieved.

Figure 11A:
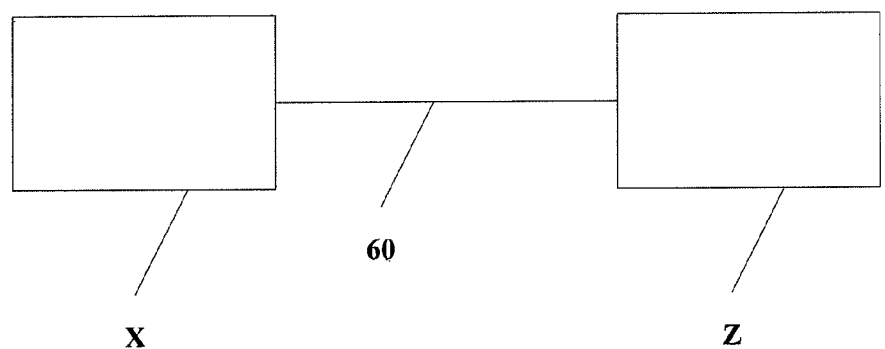
FIGS. 11A and 11B illustrate a plurality of the apparatus coupled together.
Figure 11B:
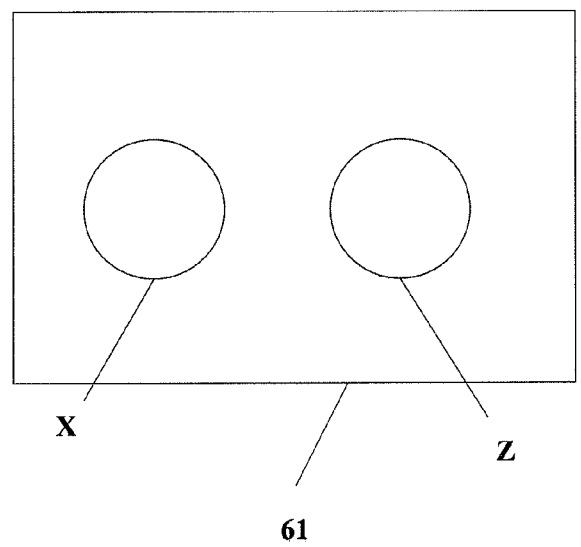

It is also possible to produce an operation such that the drawings of constellations are turned on and off on a background of the stars by using a plurality of the apparatus as shown in FIGS. 11A and 11B, overlapping a plurality of projected images with each other by operating the plurality of apparatus in conjunction with each other, mounting a base plate which projects, for example, only the drawings of the constellations to one apparatus and a base plate which projects only the stars to the other apparatus, maintaining the projecting apparatus having the base plate of the stars mounted thereto always in an ON-state and switching the state of the projecting apparatus having the base plate of the drawings of the constellations between on and off. Such operation is achieved by electrically connecting 60 these apparatuses X, Z and turning on and off the respective projecting apparatus through a control circuit, as shown in FIG. 11A. It is also possible to turn these apparatus on and off by mechanically connecting 61 these apparatus so as to be operated in conjunction with each other, as shown in FIG. 11B. The same application is also achieved on other celestial bodies such as aurora, or characters, as a matter of course.

In this manner, the simplified planetarium apparatus for enjoying the beautiful starry sky is achieved without using a specific dome at home, which has been difficult in the related art. It is preferable for the study of science for the young, and also for relaxation of all generations. Since given images can be projected simultaneously with the function to project the stars, wide range of applications are possible for studies and recreations. In addition, according to the simplified planetarium apparatus and the simplified image projecting apparatus in the invention, the content of projection can easily be changed by providing the mechanism which mounts and demounts the transmissive base plate as described above.

Figure 1B:
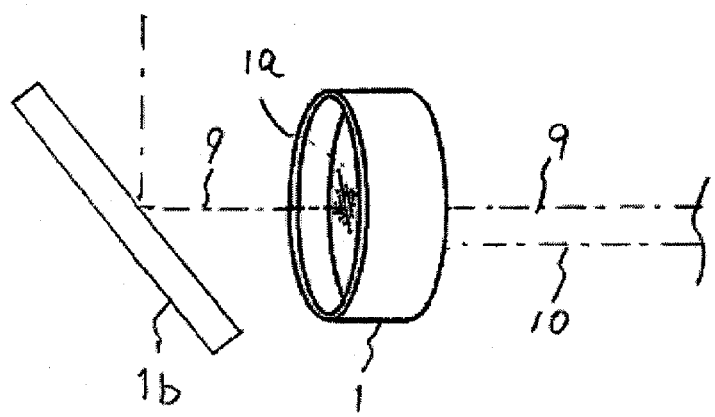
FIG. 1B and FIG. 1C are partial schematic perspective views showing modifications of the embodiment shown in FIG. 1A.
Figure 1C:
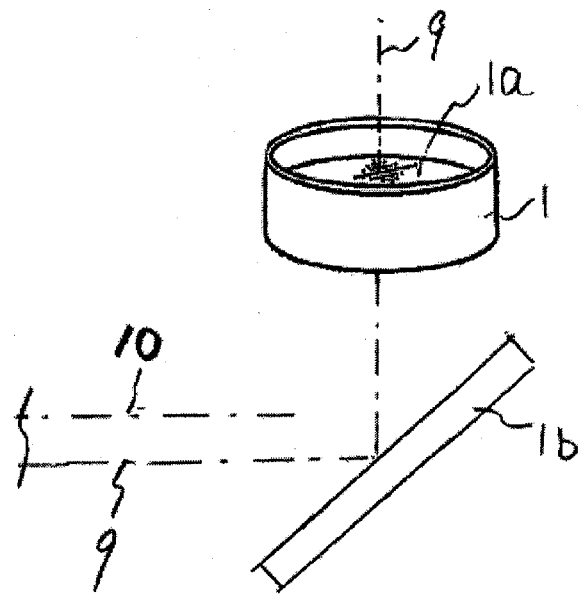

In the embodiments shown above, examples in which light passed through the transmissive base plate is projected on the ceiling have been described. However, a configuration in which the direction of projection is changed by inserting a reflecting mirror 1b on the back side of the projection lens 1a as shown in FIG. 1C is also applicable. Alternatively, a configuration in which the direction of light is changed by the reflecting mirror 1b before projecting with the projection 1a as shown in FIG. 1(B) lens is also applicable. In this configuration, projection on a vertical surface or an inclined surface such as a wall in the house is achieved. Although the examples of projection on the flat plane have been described above, projection on a curved surface or a spherical surface as a screen is also possible.

Although the examples in which the light-emitting diode is used as the light source have been described, other colored light sources may be used. Although the examples in which the rack pinion system is employed as means for moving the slide plate in the slide rail mechanism have been described, other mechanism is also applicable as long as it converts the rotational movement of the motor into a linear movement.

Although the examples in which the center of rotation of the transmissive base plate and the optical axis of the optical system are deviated are shown above, a mechanism which rotates the transmissive base plate with the center of rotation aligned with the optical axis of the optical system is also applicable.

As described thus far, according to the invention, the planetarium apparatus with a simple configuration which is to be installed for family use and is capable of reproducing the constellations on the ceiling, and can be used as a normal image projecting apparatus is provided.

What is claimed is:

1. A simplified planetarium apparatus comprising:
   a light source;
   a light converging optical system that converges light from the light source;
   a diaphragm having a window configured to pass the converged light, a center of the window being arranged correspondingly to a zenith of the sky;
   a rotation mechanism configured to rotate a replaceably mounted stellar base plate having a pattern of holes transparent to the light from said light source and arranged correspondingly to stars, a rotation axis of the stellar base plate being arranged correspondingly toward a celestial pole;
   a projection system configured to project an image of a portion of the stellar base plate corresponding to said window; and
   a sliding mechanism configured to change the distance of the rotation axis of the stellar base plate from an optical axis within an area of said window,
   wherein the rotation axis and the optical axis are both positioned within the window and arranged in parallel with, and spacedly from, one another so that portions of the stellar base plate exposed to the window move as the stellar base plate rotates while portions of the stellar base plate around the center portion remain exposed to the window,
   whereby a simulated diurnal motion of stars rotating around the celestial pole is projected from the projection system at a latitude corresponding to the distance.

2. A planetarium apparatus; comprising:
   a converged light source;
   an opaque plate having a circular window arranged to pass the light from the converged light, the center of the window being arranged correspondingly to a zenith of the sky;
   a rotation mechanism configured to rotate replaceably mounted image-carrying plate formed with a light-shielding plate having a large number of spots transparent to the light from said light source and arranged correspondingly to stars in the sky, a rotation axis of the image carrying plate being arranged correspondingly toward a celestial pole:
   a projection system configured to project an image of a portion of the image-carrying plate corresponding to said window; and
   a sliding mechanism configured to change the distance of the rotation axis of the image-carrying plate from an optical axis within an area of said window,
   wherein the rotation axis and the optical axis are both positioned within said window and disposed in parallel with, and spacedly from, one another so that portions of the image-carrying plate exposed to the window move as the image-carrying plate rotates while portions of the image-carrying plate around the center portion remain exposed to the window,
   whereby a simulated diurnal motion of stars rotating around the celestial pole is projected from the projection system at a latitude corresponding the distance.

3. A simplified planetarium apparatus comprising:
   a light source;
   a light converging optical system that converges light from the light source;
   a diaphragm having a window configured to pass the converged light, a center of the window being arranged correspondingly to a zenith of the sky;
   a rotation mechanism configured to rotate a replaceably mounted stellar base plate having patterns of holes transparent to the light from said light source and arranged correspondingly to stars, a rotation axis of the stellar base plate being arranged correspondingly toward a celestial pole; and
   a projection system configured to project an image of a portion of the stellar base plate corresponding to said window;
   wherein the rotation axis and an optical axis are both positioned within the window and arranged in parallel with, and spacedly from, one another so that portions of the stellar base plate exposed to the window move as the stellar base plate rotates while portions of the stellar base plate around the center portion remain exposed to the window,
   whereby a simulated diurnal motion of stars rotating around the celestial pole is projected from the projection system.

4. The simplified planetarium apparatus according to claim 3 wherein said diaphragm is located in front of or behind the stellar base plate.

5. The simplified planetarium apparatus according to claim 3, wherein the light source is a light-emitting diode.

6. The simplified planetarium apparatus comprising a plurality of the apparatus according to claim 3 electrically or mechanically connected operably with each other.

7. The planetarium apparatus according to claim 3, wherein the light source is a light-emitting diode.

8. The planetarium apparatus comprising a plurality of the apparatus according to claim 3 electrically or mechanically connected operably with each other.

9. A planetarium apparatus comprising:
   a converged light source;
   an opaque plate having a circular window arranged to pass the light from the converged light, a center of the window being arranged correspondingly to a zenith of the sky;
   a rotation mechanism configured to rotate a replaceably mounted image-carrying plate formed with a light-shielding plate having a large number of spots transparent to the light of said light source and arranged correspondingly to stars in the sky, a rotation axis of the image-carrying plate being arranged correspondingly toward a celestial pole; and a projection system configured to project an image of a portion of the image-carrying plate corresponding to said window;

wherein an optical axis and the rotation axis are both within said window and disposed in parallel with, and spacedly from, one another so that portions of the image-carrying plate exposed to the window move as the image-carrying plate rotates while portions of the image-carrying plate around the center portion remain exposed to the window, whereby a simulated diurnal motion of stars rotating around the celestial pole is projected from the projection system.

10. The planetarium apparatus according to claim 9, wherein the opaque plate having the circular window is located in front of or behind the image-carrying plate.

11. A planetarium apparatus comprising:

a single converged light source;

an opaque plate having a circular window arranged so that the optical axis of the single converged light passes through the window, the center of the window being arranged correspondingly to a zenith of the sky;

a rotation mechanism configured to rotate a replaceably mounted image-carrying plate formed with a light-shielding plate having a large number of spots transparent to the light of said light source and arranged correspondingly to stars in the sky, a rotation axis of the image-carrying plate being arranged correspondingly toward a celestial pole; and an optical projection system configured to project an image of a portion of the image-carrying plate exposed to said window;

wherein an optical axis and the rotation axis are both positioned within said window and disposed in parallel with, and spacedly from, one another so that portions of the image-carrying plate are exposed to the window as the image-carrying plate rotates while portions of the image-carrying plate around the center portion remain exposed to the window, whereby a simulated diurnal motion of stars correspondingly positioned from the zenith to the horizon on the celestial sphere and rotating around the celestial pole is projected from the projection optical system with the single converged light even on a flat ceiling of a room.

12. A planetarium apparatus comprising;

a single converged light source;

an opaque plate having a circular window arranged so that the optical axis of the single converged light passes through the window, a center of the window being arranged correspondingly to a zenith of the sky;

mounting means configured to support rotatably and replaceably an image-carrying plate at its periphery so as not to obstruct the light passing through the window, the image-carrying plate being formed with a light-shielding plate having a large number of spots transparent to the light from said light source and arranged correspondingly to stars in the sky;

a rotation mechanism located outside of the window and configured to conduct a rotation movement to the periphery of the image-carrying plate so that the image-carrying plate rotates about a rotation axis which is positioned within the window and is arranged correspondingly toward a celestial pole; and a projection system configured to project an image of a portion of the image-carrying plate exposed to said window;

wherein an optical axis and the rotation axis are both positioned within said window and arranged in parallel with, and spacedly from, one another so that portions of the image-carrying plate exposed to the window move as the image-carrying plate rotates while portions of the image-carrying plate around the center portion remain exposed to the window, whereby a simulated diurnal motion of stars positioned correspondingly from the zenith to the horizon on the celestial sphere and rotating around the celestial pole is projected from the projection system with the single converged light.

* * * * *